L. C. JABLESNIK.
ABRADANT COMPOUND.
APPLICATION FILED FEB. 3, 1912.

1,034,712.

Patented Aug. 6, 1912.

Witnesses.
Edward W. Champion
Edward R. Abbott

Inventor.
Louis C. Jablesnik

UNITED STATES PATENT OFFICE.

LOUIS C. JABLESNIK, OF BERGENFIELD, NEW JERSEY, ASSIGNOR TO BELDING AND FRANKLIN MACHINE COMPANY, OF NEW YORK, N. Y.

ABRADANT COMPOUND.

1,034,712.   Specification of Letters Patent.   Patented Aug. 6, 1912.

Application filed February 3, 1912. Serial No. 675,397.

*To all whom it may concern:*

Be it known that I, LOUIS C. JABLESNIK, a citizen of the United States, residing at Bergenfield, in the county of Bergen and State of New Jersey, have invented a new and useful Improvement in Abradant Compounds, of which the following is a full, clear, and exact description, reference being had to the accompanying drawings, forming a part of this specification, in which—

Figures 1, 2:
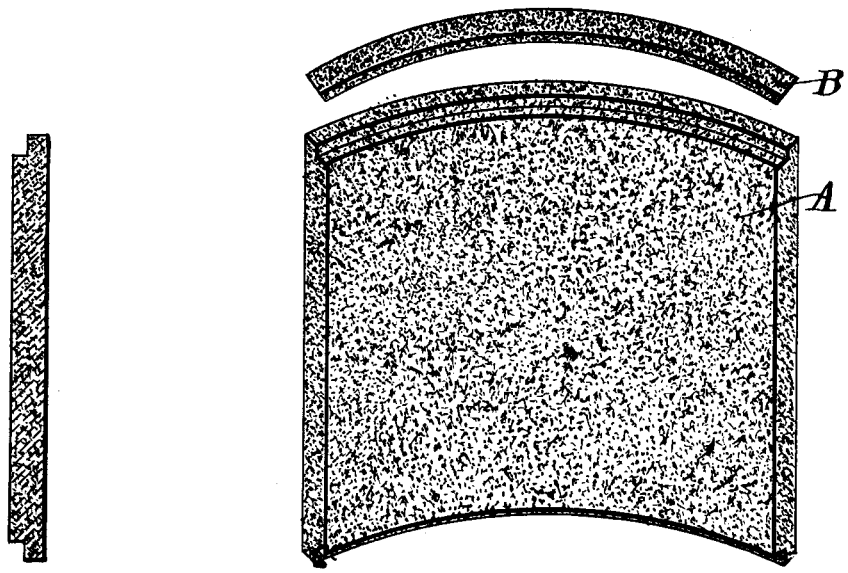
Figures 3, 4:
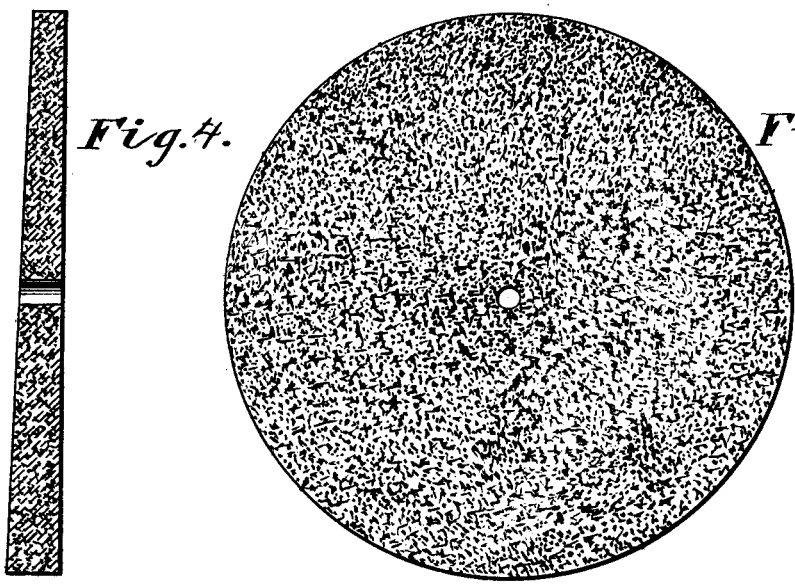

Figure 1 is a front and top view of a segment of lining for drum interiors made of such composition. Fig. 2 is a sectional view of the same. Fig. 3 is a plan view of the disk, and Fig. 4 is a sectional view of a disk, having one of its sides slanting.

My composition consists of the following ingredients, combined in the proportion stated, viz: Mastic, (asphalt with oil eliminated,) 60%; asphalt, 5%; granulated abradants, 30%; cement, 5%. These ingredients are to be thoroughly mingled, by, first heating the mastic and asphalt until in plastic condition, and then adding the granulated abradants and cement, and thoroughly mixing or mingling. While hot and plastic, the composition is then placed in molds of suitable size and thickness, and allowed to cool and harden.

In using the above named composition as abradant for drum interiors and disks of a vegetable peeling machine, it is desirable to have the thickness of the composition about $1\frac{1}{8}''$. The disk, or revolving bottom of the machine is molded in one piece of this composition, and the sides of the drum, or cylinder, are preferably molded in segments of this composition fitting tightly together side by side.

The merit and value of my improvement in composition of matter for the purposes set forth are, that this composition provides a hard, solid abradant body that cannot wear smooth—is not attached to iron or metal, and possesses no property that forms rust. Vegetable peeling by machinery is a wet process, that is, a spray of water plays upon the vegetables during the peeling process, and the elimination of rust producing materials is the object of this composition.

I am aware that granulated abradants, such as granulated carborundum, flint, crushed granite, etc., have been used as interior linings for vegetable peeling machines, when attached to iron, or metal castings, either by sprinkling the mold with carborundum, and then pouring in the metal, or by attaching the granulated abradants to cast iron, or metal by means of enamel or otherwise, and I am also aware that a patent was granted Mr. Samuel B. Archer, of Saratoga Springs, N. Y., August 1, 1911, No. 999478, covering such attachments of granulated abradants to cast iron or metal: but, I am not aware that all the ingredients of my composition, as a detached, solid-body abradant have been used together for the purpose stated, or otherwise.

I claim:

1. The herein described composition of matter, consisting of mastic, asphalt, granulated abradants and cement, substantially as described, and for the purpose specified, as a solid, detached abradant body.

2. The herein described composition of matter, for solid-body detached abradant for drum or cylinder interiors and revolving bottom disks of vegetable peeling machines, consisting of mastic (asphalt with oil eliminated) 60%, asphalt, 5%, granulated abradants 30% and cement 5%, substantially as described.

In testimony whereof, I, LOUIS C. JABLESNIK, have signed my name to this specification in the presence of two subscribing witnesses, this twenty-sixth day of January 1912.

LOUIS C. JABLESNIK.

Witnesses:
EDWARD W. CHAMPION,
EDWARD R. ABBOT.